United States Patent
Goenka et al.

(10) Patent No.: US 10,805,288 B2
(45) Date of Patent: Oct. 13, 2020

(54) AUTHENITCATION ENTITY FOR USER AUTHENTICATION

(71) Applicant: Yahoo Holdings, Inc., Sunnyvale, CA (US)

(72) Inventors: Mohit Goenka, Santa Clara, CA (US); Nikita Varma, Milpitas, CA (US); Ashish Khushal Dharamshi, Sunnyvale, CA (US)

(73) Assignee: Oath Inc., New York, NY (US)

( * ) Notice: Subject to any disclaimer, the term of this patent is extended or adjusted under 35 U.S.C. 154(b) by 153 days.

(21) Appl. No.: 15/826,844

(22) Filed: Nov. 30, 2017

(65) Prior Publication Data

US 2019/0166120 A1    May 30, 2019

(51) Int. Cl.
*H04L 29/06* (2006.01)
*H04L 29/08* (2006.01)
(Continued)

(52) U.S. Cl.
CPC ...... *H04L 63/0861* (2013.01); *G07C 9/00309* (2013.01); *G07C 9/00563* (2013.01); *G07C 9/00571* (2013.01); *G07C 9/253* (2020.01); *G07C 9/257* (2020.01); *G08B 13/22* (2013.01); *H04L 63/108* (2013.01); *H04L 67/18* (2013.01);
(Continued)

(58) Field of Classification Search
CPC ...... G06F 17/248; G06F 3/0482; G06F 21/00; G06F 21/31; G06F 21/32; G06F 21/33; G06F 21/43; G06F 21/445; G06F 21/554; G06F 21/88; G06F 2221/2103; G06F 2221/2115; G06Q 20/04; G06Q 20/24; G06Q 20/382; G06Q 20/383; G06Q 20/401; G06Q 20/425; G06Q 30/01; G06Q 30/02; G06Q 30/0271; G06Q 30/06; G06Q 20/38; G06Q 20/385; G06Q 20/40; H04L 2463/061; H04L 2463/101; H04L 2463/102; H04L 51/32; H04L 63/0428; H04L 63/061; H04L 63/0853; H04L 63/083; H04L 27/00; H04L 63/0421; H04L 63/08; H04L 63/0861; H04L 63/0869; H04L 63/0884; H04L 9/3231;
(Continued)

(56) References Cited

U.S. PATENT DOCUMENTS 8,533,485 B1* 9/2013 Bansal ............... H04L 63/08
713/186
2007/0240204 A1* 10/2007 Somekawa ......... H04L 63/08
726/5

(Continued)

*Primary Examiner* — Abiy Getachew
(74) *Attorney, Agent, or Firm* — Cooper Legal Group, LLC (57) ABSTRACT

One or more computing devices, systems, and/or methods for user authentication by an authentication entity are provided. For example, an authentication relationship is established between a remote device and an authentication entity. The remote device may provide a service for which a user has registered an account, such as an email account, a social network account, etc. A request is received from the remote device to authenticate the user. The authentication entity facilitates a biometric authentication challenge through a user device. Results of the biometric authentication challenge are determined and used to transmit a message of successful authentication or failed authentication over a network to the remote device.

20 Claims, 8 Drawing Sheets

(51) Int. Cl.
  *G07C 9/00* (2020.01)
  *G08B 13/22* (2006.01)
  *G07C 9/25* (2020.01)

(52) U.S. Cl.
  CPC .... *H04L 67/22* (2013.01); *G07C 2009/00325* (2013.01); *G07C 2009/00412* (2013.01)

(58) Field of Classification Search
  CPC ......... H04M 1/72547; H04M 1/72561; H04M 2250/14; H04W 4/12; H04W 4/80
  See application file for complete search history.

(56) References Cited

U.S. PATENT DOCUMENTS

| | | | |
|---|---|---|---|
| 2008/0181401 A1* | 7/2008 | Picquenot | H04L 9/3271 380/247 |
| 2008/0195824 A1* | 8/2008 | Sadovsky | G06F 21/62 711/158 |
| 2014/0123231 A1* | 5/2014 | Low | H04L 63/0892 726/4 |
| 2014/0289340 A1* | 9/2014 | Yalcinalp | H04L 51/32 709/206 |
| 2017/0180125 A1* | 6/2017 | Bobinski | G07C 9/00087 |
| 2017/0264599 A1* | 9/2017 | O'Regan | G06F 21/32 |

* cited by examiner

AUTHENITCATION ENTITY FOR USER AUTHENTICATION

BACKGROUND

Many users maintain user accounts with various services. In one example, a user may have an email account with an email service in order to send and receive emails. In another example, the user may have an online bank account with a banking service in order to view account balance information and perform fund transfers. In this way, the user may have a hundred or more accounts with different services. To provide security and privacy for the user, services may require that the user authenticate with the service before granting the user access to an account. For example, the user can create a username and password with a service. Thus, when the user attempts to access an account with the service, the user must enter the correct username and password combination in order to access the account with the service. Unfortunately, the service is burdened with the task of tracking, managing, and authenticating accounts of all users of the service, which can be hundreds of thousands or more accounts. Also, the user is burdened with the task of tracking, managing, and remembering login credentials for all the different services for which the user has an account. The user may reuse the same login credentials and use weak passwords for multiple services so that it is easier for the user to recall such information when requested. However, this can reduce the level of security and protection provided to the user.

SUMMARY

In accordance with the present disclosure, one or more computing devices and/or methods for user authentication by an authentication entity are provided. In one embodiment, an authentication relationship is established between an authentication entity and a remote device. In one example, the authentication entity may be hosted within an authentication computing device (e.g., an authentication server). In another example, the authentication entity may comprise a standalone authentication application or may be integrated into an operating system of a user computing device (e.g., a mobile phone of a user). The remote device may be associated with a service, such as a smart door capable of unlocking for the user, a vehicle computing device capable of operating a vehicle for the user, an email server providing an email service, a social network server providing a social network service, a bank server providing an online banking service, etc.

A request is received from the remote device over a network by the authentication entity to authenticate the user. For example, the user may be attempting to log into an email account, a social network account, open a door to the user's home, open a door to the user's car, etc., and thus a corresponding service may transmit the request from the remote device to the authentication entity (e.g., to the application or operating system of the user computing device or to the authentication computing device). Accordingly, a biometric authentication challenge is provided to the user through the user computing device, such as fingerprint authentication, facial recognition, a retinal scan, etc. The biometric authentication challenge may be provided through a user interface populated with various information, such as a description of a service provided by the remote device, a username of an account for which access is being requested, an image or video captured by a sensor of the vehicle or smart door, a location of an entity attempting to access the service, etc. If the authentication entity is hosted by the user computing device, then the authentication entity provides the biometric authentication challenge. If the authentication entity is hosted by the authentication computing device, then the authentication entity sends a command over a network to the user computing device to provide the biometric authentication challenge through the user computing device.

A result of the user attempting to authenticate through the biometric authentication challenge is determined (e.g., received by the authentication computing device from the user computing device over the network). In one example, the result comprises an encrypted key created based upon fingerprint authentication of the user. A message is transmitted over the network from the authentication entity to the remote computing device based upon the result. The message may indicate that the user succeeded or failed to authenticate at the user computing device through the biometric authentication challenge. In one example, the message does not comprise a password or any other authentication credential of the user, but merely comprises a success or failure message. In another example, the authentication determination is performed at and by the user computing device instead of at the remote device, and thus the remote device does not need to manage login credentials and/or authenticate users. In this way, the authentication entity can be used by a plurality of services (e.g., email services, smart doors, cars, social network services, banking services, shopping services, etc.) to perform authentication on behalf of the services.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
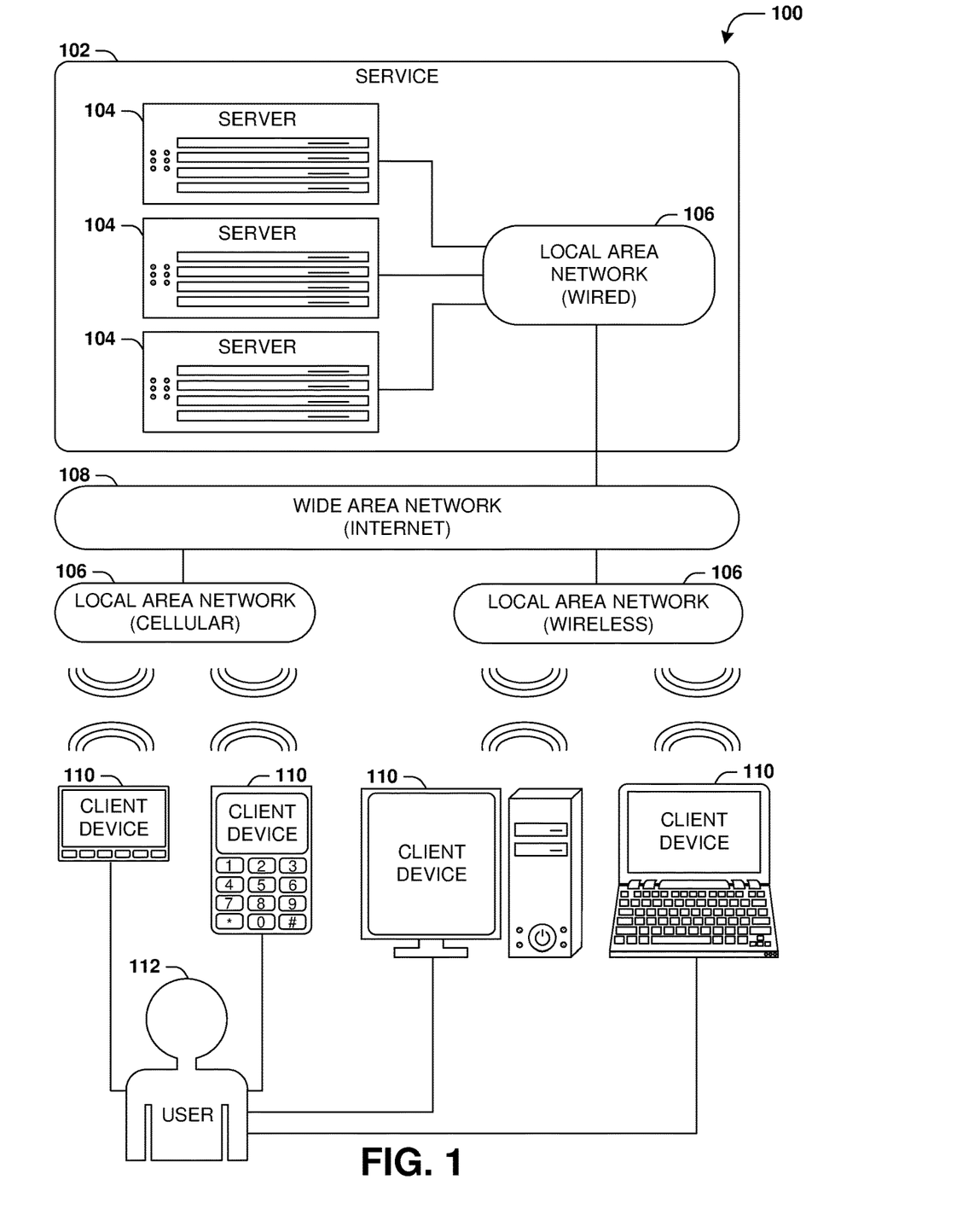
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
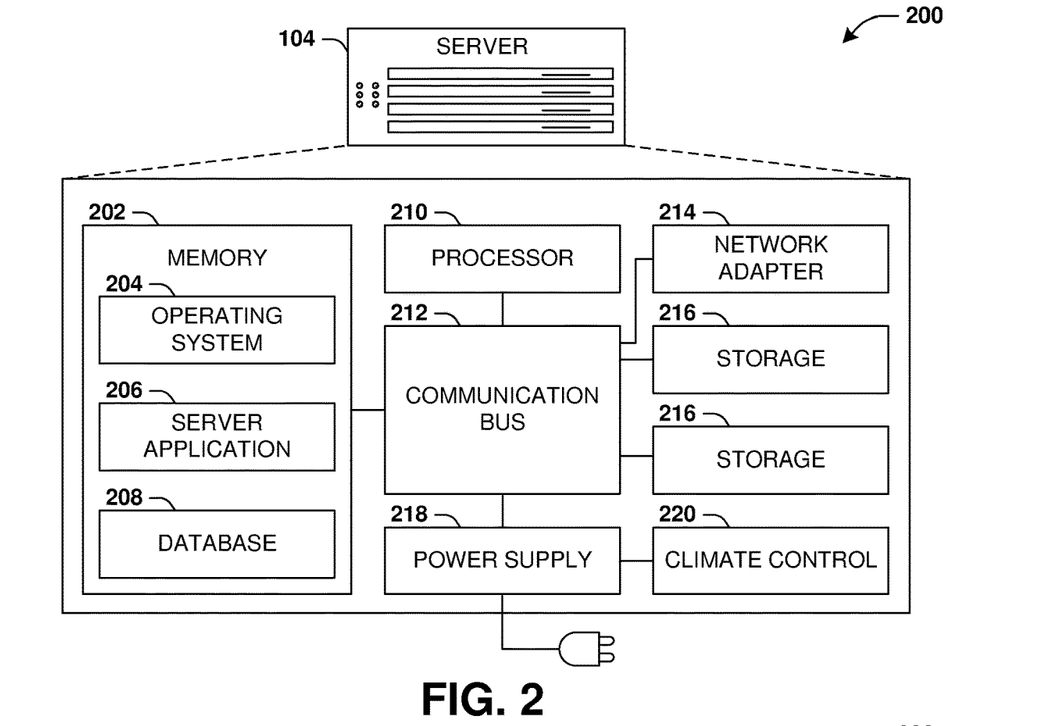
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
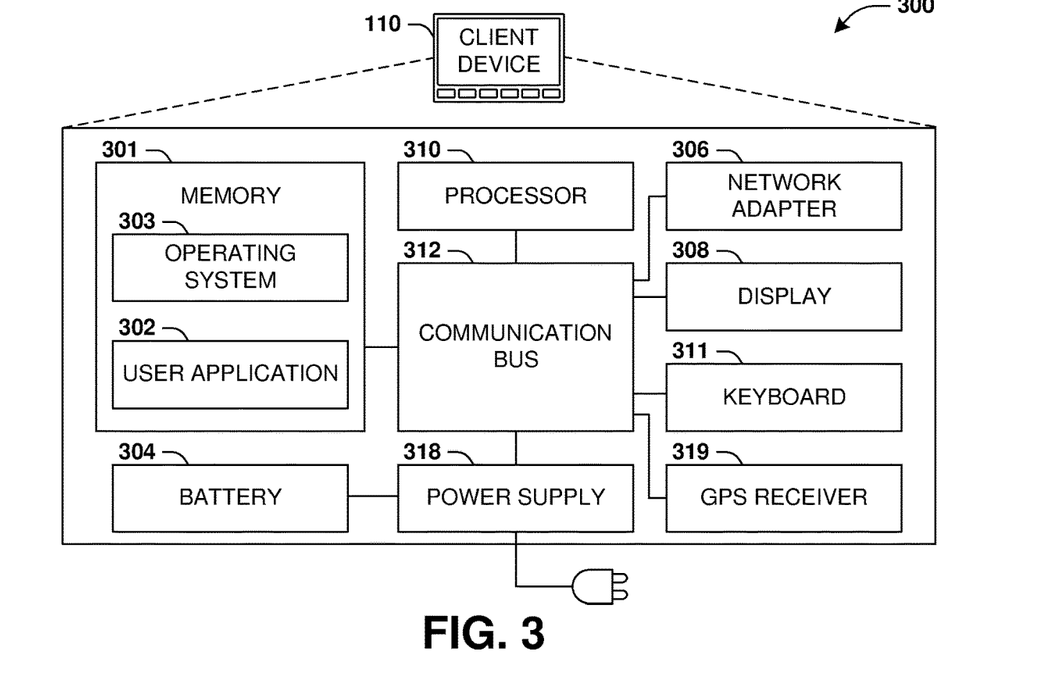
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for user authentication by an authentication entity are provided. A service, such as an email service having hundreds of thousands or more users, may utilize a considerable amount of computing resources to create and store login credentials, manage the login credentials, and authenticate users with the login credentials. Many users may utilize the same login credentials for various services, and thus such services waste substantial amounts of computing resources to redundantly create, store, manage, and utilize login credentials. A user may have many accounts that individually have their own login credentials. For example, a user may have over a hundred accounts with various banking services, email services, social networks, shopping websites, operating systems, etc. It is difficult for the user to recall login credentials for such a large number of different accounts. In an attempt to alieve this issue, the user may use the same simple weak password for multiple accounts. Unfortunately, this poses a security and privacy risk for the user because the same simple weak password for the multiple accounts may be easily guessed and compromised.

Accordingly, as provided herein, user account security, privacy, and computing resource utilization for authenticating users is improved. In particular, an authentication entity (e.g., an authentication application executing on a user computing device such as a phone, a feature integrated into an operating system of the phone, an authentication server, etc.) is configured to establish authentication relationships with a plurality of services so that the authentication entity can handle the authentication of users on behalf of the services, such as through biometric authentication (e.g., fingerprint authentication, a retinal scan, facial recognition, etc.). In this way, the services can conserve resources that otherwise would have been wasted on authenticating users. Security is improved because the authentication entity uses biometric authentication, which is more secure than simple passwords that users may otherwise use (e.g., a fingerprint is difficult to fake, guess, etc.). The authentication entity can establish authentication relationships with a wide variety of diverse services, such as email services, banking services, social networks, smart doors, smart cars, payment mechanisms (e.g., a gas station pump payment mechanism, a retail store payment mechanism, etc.), workplace security, access to a mailbox, etc. Thus, the single authentication entity can improve security and performance for a vast number of services and their users.

Figure 4:
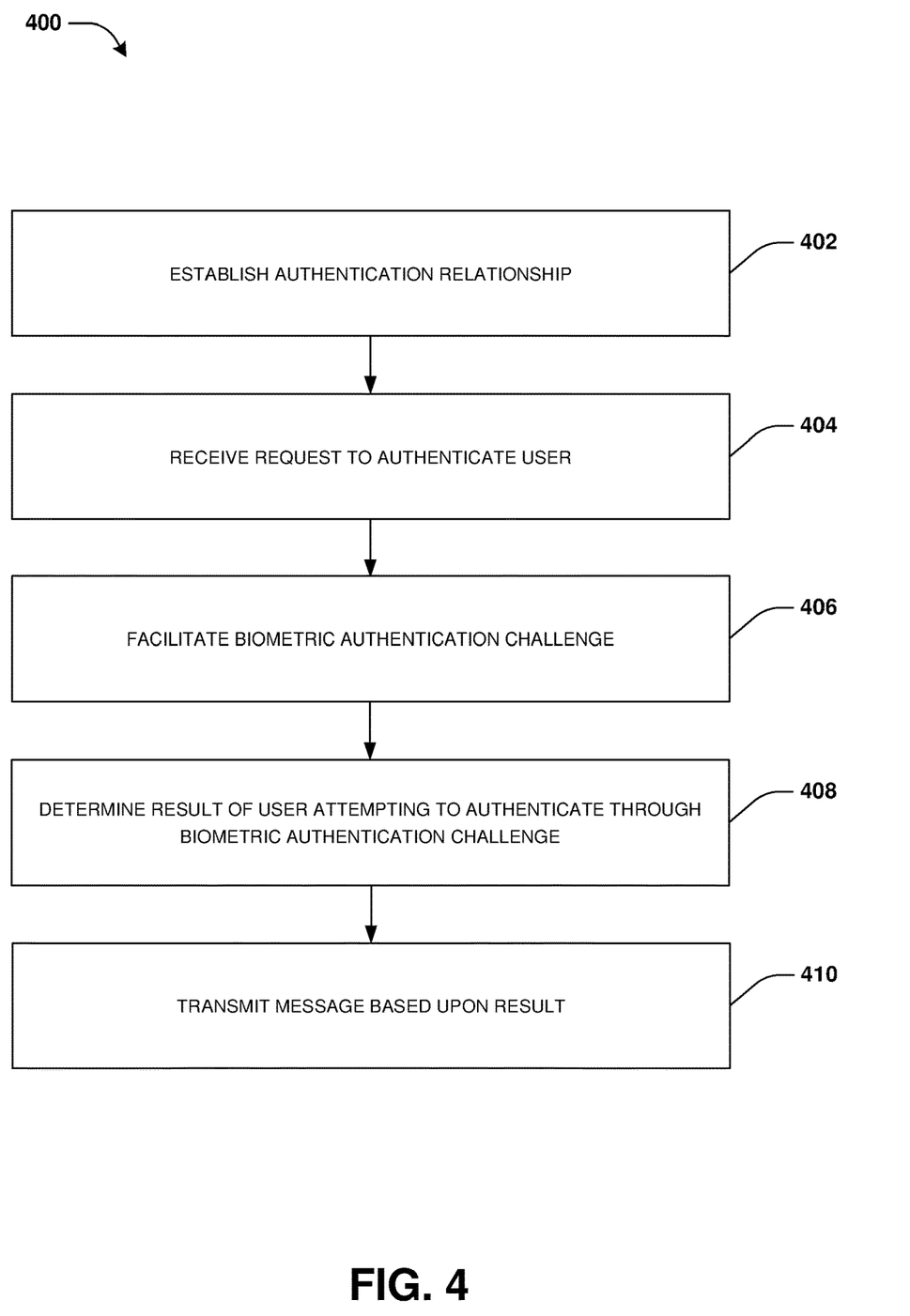
FIG. 4 is a flow chart illustrating an example method for user authentication by an authentication entity.

An embodiment of user authentication is illustrated by an example method 400 of FIG. 4. At 402, an authentication entity may establish an authentication relationship between the authentication entity and a remote device. In one example, the authentication entity may be hosted as an application on a user computing device (e.g., a mobile phone, a tablet, a wearable device, a desktop computer, a laptop computer, etc.). In another example, the authentication entity may be hosted as part of an operating system of the user computing device. In another example, the authentication entity is hosted by an authentication computing device external to the user computing device, such as an authentication server.

The authentication relationship may be established in various ways, such as through a handshake exchange of a username of a user for which the authentication entity is to authenticate for access to a service provided by the remote device, such as to an email account provided by an email service hosted by the remote device. The authentication relationship may be stored by the authentication entity within a data structure comprising the username and/or other information such as acceptable or referred authentication techniques requested by the remote device, user login credentials of the user with the service, communication information of the remote device (e.g., an IP address, a communication protocol, and/or other information used to transmit information to the remote device), security information (e.g., encryption keys) used to securely communicate information between the authentication entity and the remote device, etc.

In this way, the authentication entity may create authentication relationships with any number of remote devices hosting a variety of services.

In one example, the authentication relationship is for a single user having a user account with the service provided by the remote device (e.g., an email account of the user). In another example, the authentication relationship is for multiple users of the service (e.g., multiple guests staying within the same hotel room having doors that can automatically unlock based upon user authentication through the authentication entity).

At 404, a request is received from the remote device over a network by the authentication entity to authenticate the user that has registered with the authentication entity for authenticating through the authentication entity. The request may comprise the username of the user's account with the service hosted by the remote device. For example, the request may specify that the user is attempting to access the service through the user's account, such as trying to access an email account through an email service hosted by the remote device.

In one example where the remote device corresponds to a smart door, a vehicle computer, or other entry, the request may comprise imagery captured by a sensor associated with an entrance. The imagery may depict an entity (e.g., the user or someone else at the door such as the user's mother attempting to drop off an item while the user is at work) attempting to gain entrance to a location through the entrance, such as the user's home through a front door. The imagery may be rendered through the user computing device. In another example, sensor data acquired by a sensor associated with the entrance may be received and provided through the user computing device, such as a video, audio, a notification of a motion sensor being tripped, etc. In another example, the request may be evaluated to determine that the user is attempting to gain entrance to the location, such as inside the user's house or vehicle, based upon locational information (e.g., global positioning system (GPS) data; the user computing device communicating over Bluetooth with the sensor; etc.).

In another example, instead of receiving the request from the remote device, a prediction may be made based upon user signals to determine a likelihood that the user is attempting to access the service. User signals may correspond to a current time, a current location of the user computing device, a calendar entry (e.g., an entry specifying that the user has a video conference, which is an indicator that the user has a high likelihood of using a video conference service at that time), a social network post (e.g., a post indicating that the user is excited to be home in 10 minutes, which is an indicator that the user has a high likelihood of attempting to enter into the user's home through a smart door), email/message data (e.g., the user received an email about meeting immediately at the hospital, which indicates that the user has a high likelihood of entering the user's car), etc. The user signals may be evaluated to determine whether the user has a likelihood above a threshold likelihood of attempting to access the service provided by the remote device, which triggers user authentication for the user. In this way, a prediction is made that the user will likely use the service, and thus the user may be preemptively prompted to authenticate through the authentication entity for accessing the service.

The user signals may be used with historic user activity data to determine the likelihood of using the service at a particular time. The historic user activity data may indicate locations of the user at various times (e.g., GPS data indicating when the user arrives at home, leaves for work, visits a gym, etc.), activities performed by the user at various times, typical times the user logs into a service, browsing history, purchase history, etc. In one example, the user signals are evaluated to identify a current time. The historic user activity data is evaluated to determine that the user accesses the service within a threshold time of the current time, which triggers user authentication for the user. Otherwise, if the current time deviates substantially from when the user accesses the service and a device is attempting to access the service (e.g., a malicious user attempting to access the service at 2:00 am from a different country), then an alert may be provided to the user through the user computing device. In another example, the user signals are evaluated to determine that a location of the user computing device is within a threshold distance of an entrance that is locked (e.g., a workplace building where the user works). Accordingly, user authentication is triggered.

In another example, a current location of a device attempting to access the service is identified. The user signals are evaluated to determine that the user is not located at the current location (e.g., GPS data of the user computing device indicates that the user is in a different state; a social network post indicates that the user checked in at a different location; etc.). Accordingly, an alert may be provided to the user through the user computing device. In another example, a frequency of access parameter specifying a frequency at which the user accesses the service may be maintained (e.g., the user routinely accesses the service once a month on the first Monday of every month). The user signals may be evaluated to determine that a device is attempting to access the service in a manner that deviates from the frequency of access parameter (e.g., 50 attempts to access the service within a 3 minute period, which may be indicative of a spam bot). Accordingly, an alert may be provided to the user through the user computing device.

At 406, a biometric authentication challenge is facilitated through the user computing device. For example, a user interface may be rendered through the user computing device to describe the biometric authentication challenge (e.g., an interface within which the user may place a finger for fingerprint authentication, an indication that a retinal scan will be performed, etc.). The user interface may be populated with details regarding the service, the user's account with the service such as a user name, imagery, a video, audio, and/or other sensor data associated with an entity attempting to access the service. If the authentication entity (e.g., an application executing on the user computing device) is hosted on the user computing device, then the authentication entity may facilitate or invoke the biometric authentication challenge. If the authentication entity (e.g., an authentication server) is hosted remotely from the user computing device, then the authentication entity may send a command over the network to instruct the user computing device to perform the biometric authentication challenge.

At 408, a result of the user attempting to authenticate through the biometric authentication challenge provided to the user through the user computing device may be determined. In one example where the authentication entity is external to the user computing device, the result is received over the network from the user computing device. In one example, the result may comprise an encrypted key created based upon authentication of the user fingerprint. The result may indicate success or failure to authenticate through the biometric authentication challenge.

At 410, a message is transmitted over the network from the authentication entity to the remote device based upon the result. In one example, the message does not comprise a user password or other information needed to authenticate the user because authentication has already been performed at the user computing device. The message specifies whether the user successfully authenticated or failed to authenticate through the biometric authentication. If the remote device is configurable to lock and unlock a locking device (e.g., a vehicle computer or smart door), then the message may instruct the remote device to unlock the locking device based upon successful authentication. Otherwise, the message may instruct the remote device to lock the locking device based upon failed authentication.

In one example, a revoke request is received by the authentication entity from the user computing device to revoke the authentication relationship with the remote device. The revoke request may indicate that one or more authentication challenges were successful by the user, such as a fingerprint authentication and a second authentication mechanism (e.g., a password authentication). Accordingly, the authentication relationship is revoked. In another example, the remote device may host a temporally limited service, such as where a guest has rented a hotel room for 3 days. Upon expiration of a time period such as the 3 days, the authentication relationship may be automatically revoked so that the user cannot use biometric authentication through the user computing device to gain access to the hotel room.

Figure 5:
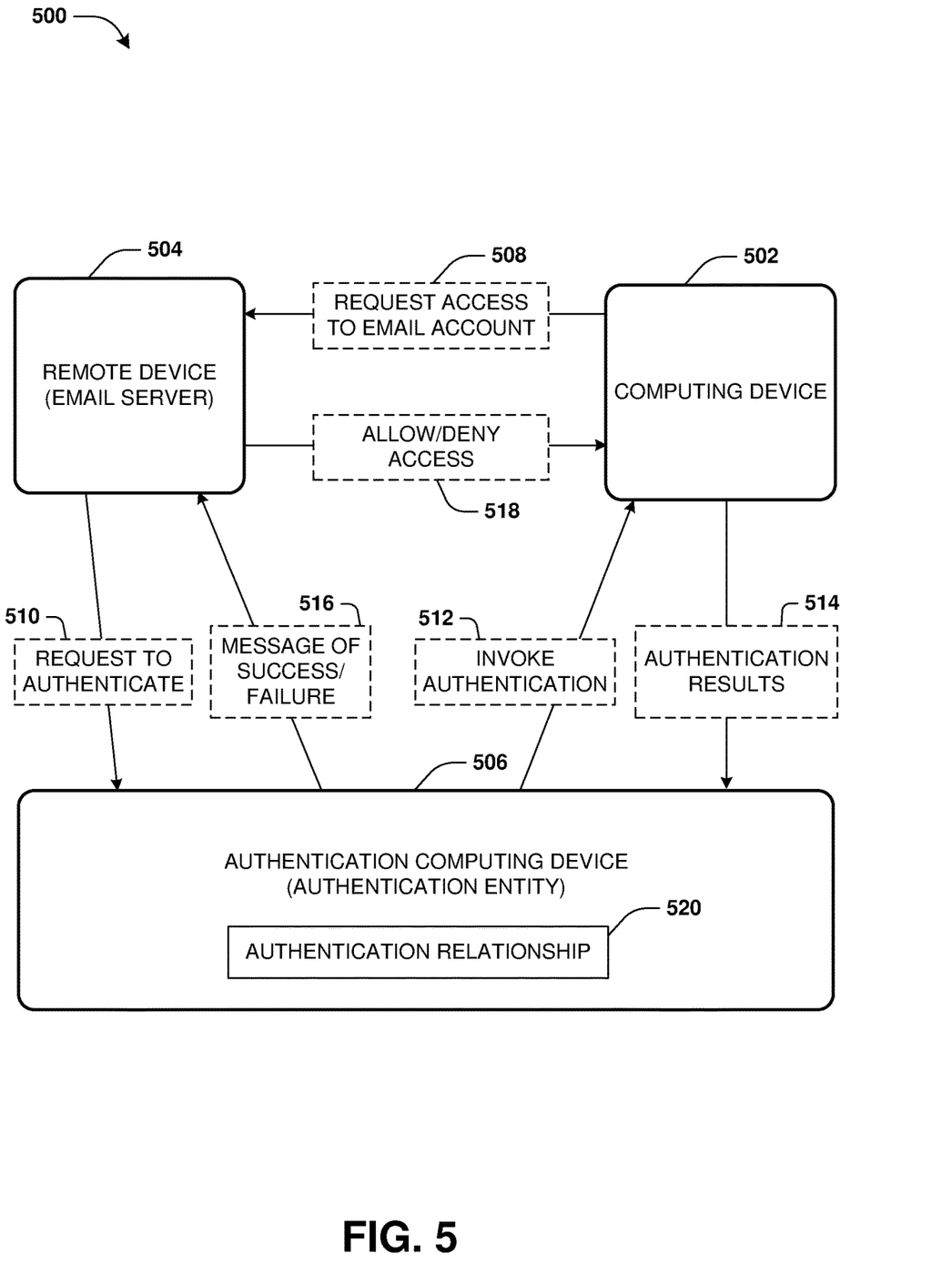
FIG. 5 is a component block diagram illustrating an example system for user authentication by an authentication entity for an email service.

FIG. 5 illustrates an example of a system 500 for user authentication. An authentication entity may be hosted by an authentication computing device 506. A user of a computing device 502, such as a mobile phone, may register with the authentication entity so that the user can authenticate with various services through biometric authentication challenges provided through the computing device 502. The user may request that the authentication entity establish an authentication relationship 520 with an email service hosted by a remote device 504, such as an email server. The authentication entity and the remote device 504 may exchange various information such as a username of an email account with which the user has with the email service, a format with which messages are to be communicated back and forth, a communication protocol to use for communication, acceptable types of authentication that the authentication entity can use, authentication capabilities of the computing device 502, etc. In this way, the authentication entity and the remote device 504 may negotiate back and forth over a network regarding how to authenticate the user through the computing device 502 on behalf of the remote device 504. The results of the negotiation may be stored within the authentication relationship 520. In this way, various authentication relationships may be created with various services by the authentication entity.

An entity, such as the user or another person, may request 508 access to the email account, such as through the computing device 502 (e.g., the user attempting to log into the email account) or a different computing device (e.g., the sister attempting to log into the user's email account using a laptop). For example, the user may navigate to an email website provided by the remote device 504. The user may input a username for the email account. In one example, the user may be provided with an option to perform remote biometric authentication, such as a button to invoke such. In another example, the user may be provided with a notification that biometric authentication will be initiated for login. The remote device 504 transmits over the network a request 510 to the authentication entity to facilitate biometric authentication of the user through the computing device 502.

The authentication entity may evaluate the authentication relationship 520 to determine that that user of the computing device 502 is registered to authenticate through the authentication entity for access to the email service provided by the remote device 504. Accordingly, the authentication entity send a command 512 to invoke the computing device 502 to provide a biometric authentication challenge to the user through the computing device 502. The user may be provided with an authentication interface comprising information related to the biometric authentication challenge (e.g., a user interface element to place a finger for fingerprint authentication, a message that a retinal scan will be conducted, etc.), a notification that someone is attempting to access the email account of the user, sensor data (e.g., an image, video, audio, location information, etc. captured by a sensor of a device or nearby the device of the person attempting to access the email account), etc.

In this way, the biometric authentication challenge is provided through the computing device 502, and the computing device 502 obtains results 514 of the biometric authentication challenge (e.g., whether an obtained fingerprint matches a stored fingerprint of the user). The results 514 are transmitted over the network to the authentication entity. The authentication entity evaluates the authentication relationship 520 to determine that the results 514 are to be provided to the remote device 504. Accordingly, the authentication entity transmits a message 516 of success or failure to authenticate based upon the results 514. The remote device 504 can use the message 516 to determine whether to grant access 518 to the email account.

Figure 6:
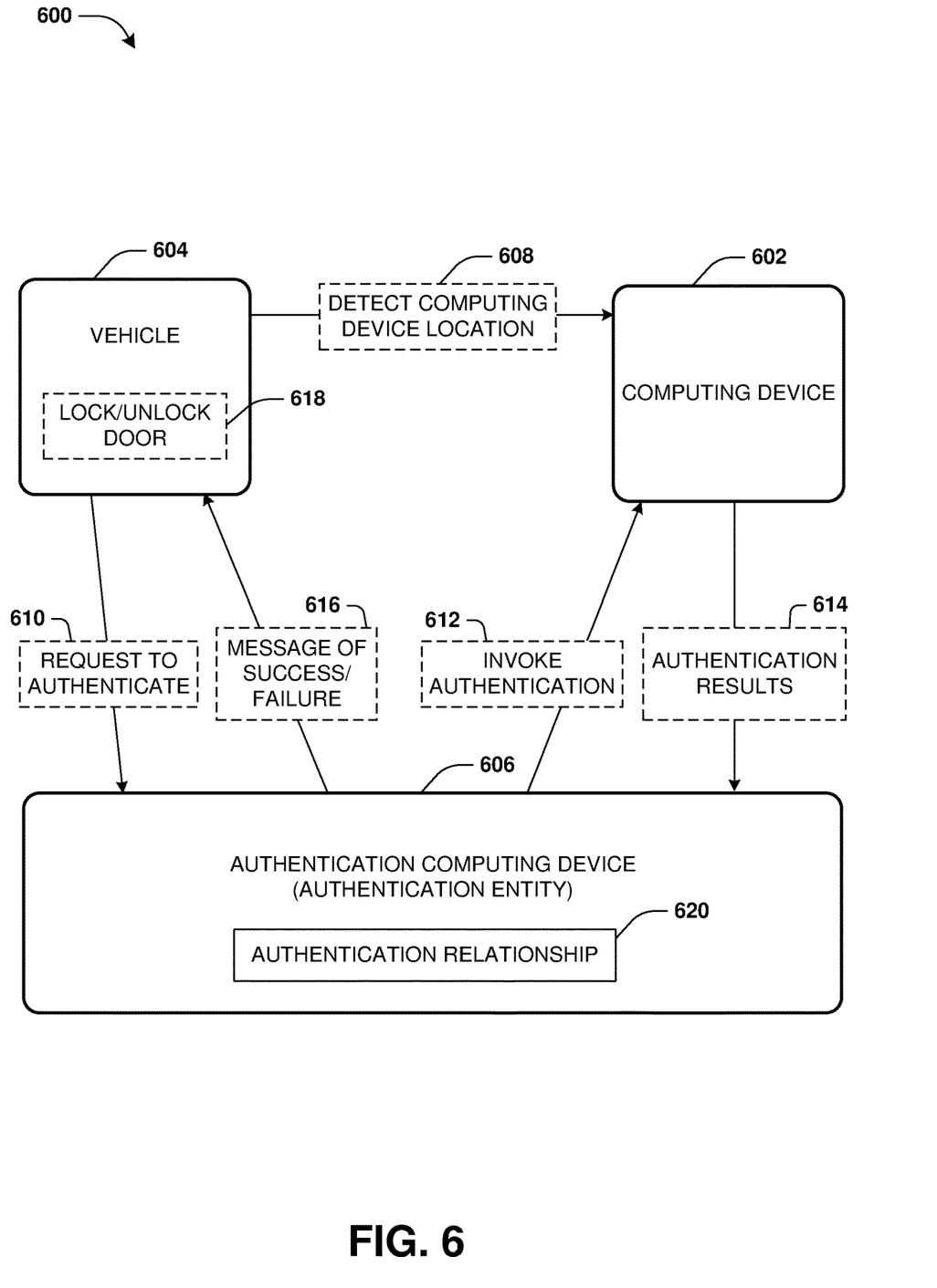
FIG. 6 is a component block diagram illustrating an example system for user authentication by an authentication entity for access to a vehicle.

FIG. 6 illustrates an example of a system 600 for user authentication. An authentication entity may be hosted by an authentication computing device 606. A user of a computing device 602, such as a mobile phone, may register with the authentication entity so that the user can authenticate with various services through biometric authentication challenges provided through the computing device 602. The user may request that the authentication entity establish an authentication relationship 620 with a vehicle computer 604 associated with a vehicle owned or rented by the user.

The authentication entity and the vehicle computer 604 may exchange various information such as a username of a vehicle account with which the user has with the vehicle computer 604, a format with which messages are to be communicated back and forth, a communication protocol to use for communication, acceptable types of authentication that the authentication entity can use, authentication capabilities of the vehicle computer 604, etc. In this way, the authentication entity and the vehicle computer 604 may negotiate back and forth over a network regarding how to authenticate the user through the computing device 602 on behalf of the vehicle computer 604. The results of the negotiation may be stored within the authentication relationship 620. In this way, various authentication relationships may be created with various services by the authentication entity.

The user may approach the vehicle while carrying the computing device 602. The vehicle computing 604 may detect 608 that the computing device 602 is within a threshold distance of the vehicle, such as based upon establishing a Bluetooth connection with the computing device 602, GPS data of the computing device 602, a radio frequency identification (RFID), etc. In one example, the authentication entity detects that the computing device 602 is within the threshold distance of the vehicle based upon GPS data transmitting from the computing device 602 to the authentication entity.

Upon detecting 608 the computing device 602, the vehicle computer 604 may transmit over the network a request 610 to the authentication entity to authenticate the user through the computing device 602. Accordingly, the authentication entity invokes 612 the computing device 602 to perform a biometric authentication challenge for the user. For example, a user interface is rendered on the computing device 602 with a message that a retinal scan will be performed so that doors of the vehicle will be unlocked for the user. In this way, the computing device 602 may perform the retinal scan and determine results 614 of the retinal scan, such as whether the user successfully passed the retinal scan or not (e.g., whether the retinal scan matched a stored retinal scan of the user).

The computing device 602 transmits of the results 614 of the biometric authentication challenge over the network to the authentication entity. The authentication entity evaluates the authentication relationship 620 to determine that the results 614 are to be provided to the vehicle computer 604. Accordingly, the authentication entity transmits a message 616 of success or failure to authenticate based upon the results 614 to the vehicle computer 604. The vehicle computer 604 can use the message 616 to determine whether to lock/unlock 618 the doors of the vehicle.

Figure 7:
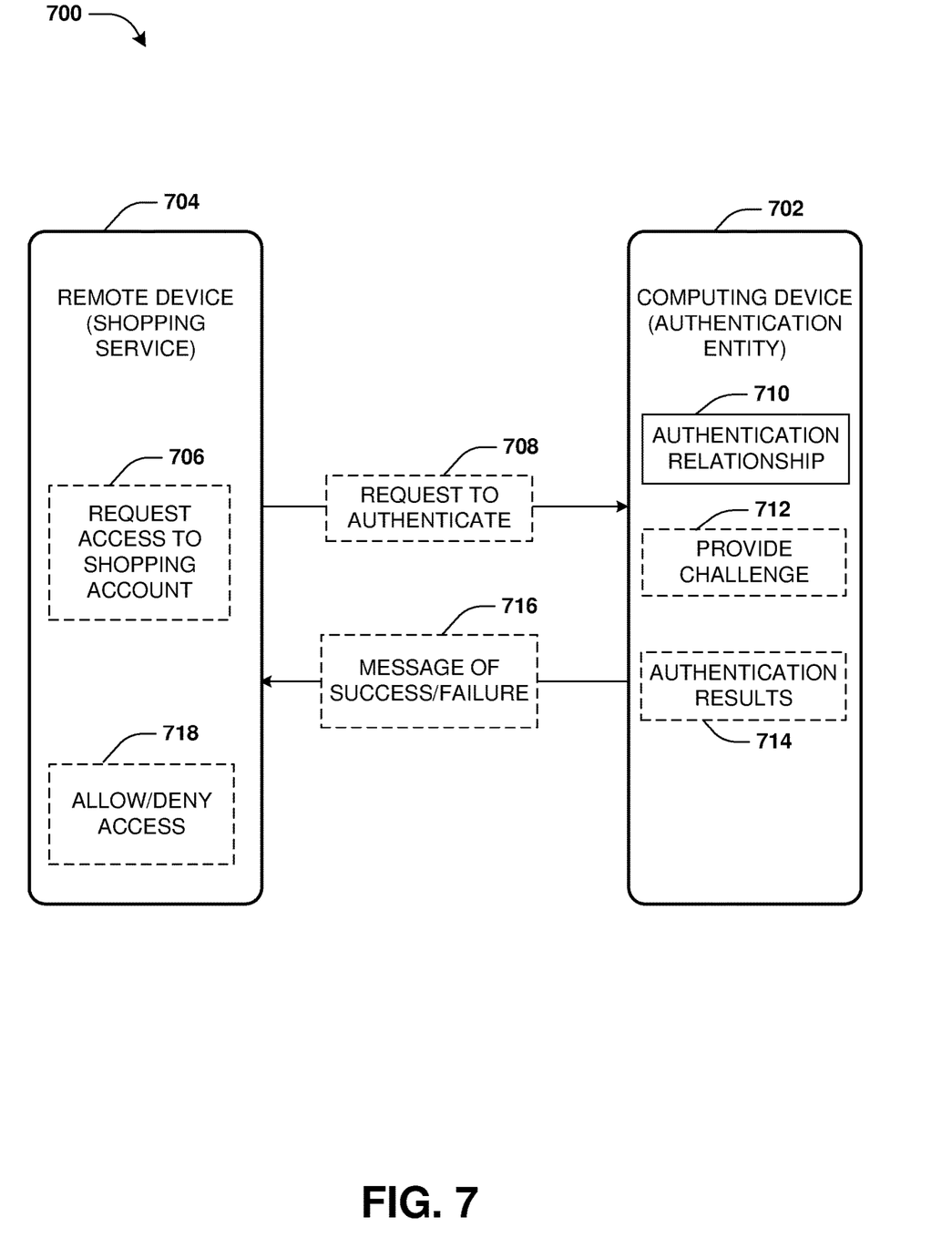
FIG. 7 is a component block diagram illustrating an example system for user authentication by an authentication entity for access to a shopping service.

FIG. 7 illustrates an example of a system 700 for user authentication. An authentication entity may be hosted by a computing device 702 of a user, such as a tablet. The authentication entity may be implemented as a standalone application of the tablet or may be integrated into an operating system of the tablet. A user of a computing device 702 may register with the authentication entity so that the user can authentication with various services through biometric authentication challenges provided through the computing device 702. The user may request that the authentication entity establish an authentication relationship 710 with a remote device 704 hosting a shopping service.

The authentication entity and the remote device 704 may exchange various information such as a username of a shopping account with which the user has with the shopping service hosted by the remote device 704, a format with which messages are to be communicated back and forth, a communication protocol to use for communication, acceptable types of authentication that the authentication entity can use, authentication capabilities of the remote device 704, etc. In this way, the authentication entity and the remote device 704 may negotiate back and forth over a network regarding how to authenticate the user through the computing device 702 on behalf of the remote device 704. The results of the negotiation may be stored within the authentication relationship 710. In this way, various authentication relationships may be created with various services by the authentication entity.

The remote device 704 may receive a request 706 to access the shopping account of the user. For example, the request 706 may be received from a desktop computer used by a second user. The remote device 704 may transmit a request 708 to the authentication entity hosted by the computing device 702 of the user over the network. The authentication entity may render a user interface through which a fingerprint authentication challenge is provided 712 with a description that someone is attempting to access the shopping account of the user. The user may decide to attempt the fingerprint authentication challenge because the user is okay with the second user, such as a spouse, accessing the shopping account from the desktop computer. Or, the user may provide input that a message should be provided to the remote device 704 that the attempted access is unauthorized and/or that further security actions should be taken by the remote device 704 to protect the shopping account of the user.

The authentication entity may determine results 714 of the fingerprint authentication challenge, such as success, failure, or a notification that the attempted access is unauthorized. The authentication entity may send a message 716 to the remote device 704 over the network based upon the results 714 of the authentication. In this way, the remote device 704 can take further action such as allow or deny access 718 to the shopping account.

Figure 8:
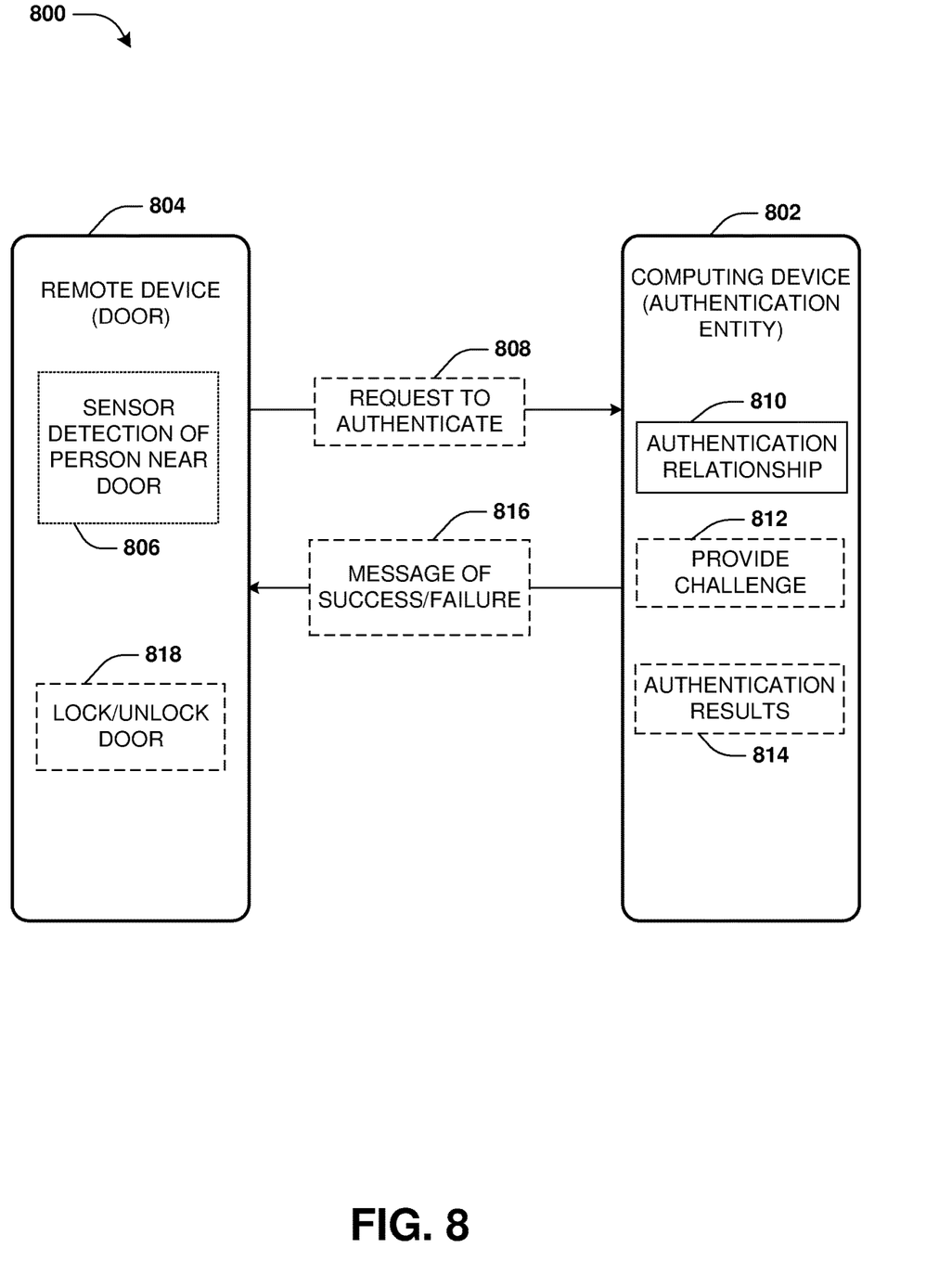
FIG. 8 is a component block diagram illustrating an example system for user authentication by an authentication entity for access to a house through a door.

FIG. 8 illustrates an example of a system 800 for user authentication. An authentication entity may be hosted by a computing device 802 of a user, such as a smart watch. The authentication entity may be implemented as a standalone application of the smart watch or may be integrated into an operating system of the smart watch. A user of a computing device 802 may register with the authentication entity so that the user can authenticate with various services through biometric authentication challenges provided through the computing device 802. The user may request that the authentication entity establish an authentication relationship 810 with a remote device 804, such as a locking mechanism capable of locking or unlocking a door to a building.

The authentication entity and the remote device 804 may exchange various information such as a user identifier of the user, a format with which messages are to be communicated back and forth, a communication protocol to use for communication, acceptable types of authentication that the authentication entity can use, authentication capabilities of the remote device 804, etc. In this way, the authentication entity and the remote device 804 may negotiate back and forth over a network regarding how to authenticate the user through the computing device 802 on behalf of the remote device 804. The results of the negotiation may be stored within the authentication relationship 810. In this way, various authentication relationships may be created with various services by the authentication entity.

A sensor of the remote device 804, such as a motion sensor, may detect 806 that a person is near the door. Accordingly, the remote device 804 may transmit a request 808 over the network to the authentication entity to request biometric authentication of the user through the computing device 802. The remote device 804 may render a user interface specifying that a facial recognition scan challenge will be provided 812 through the smart watch for authenticating the user to have the door unlocked. Results 814 of the facial recognition scan challenge may be determined. A message 816 of whether the user successfully authenticated or not based upon the results 814 may be transmitted by the authentication entity over the network to the remote device 804. The remote device 804 may use the message 816 to determine whether to lock/unlock 818 the door.

Figure 9:
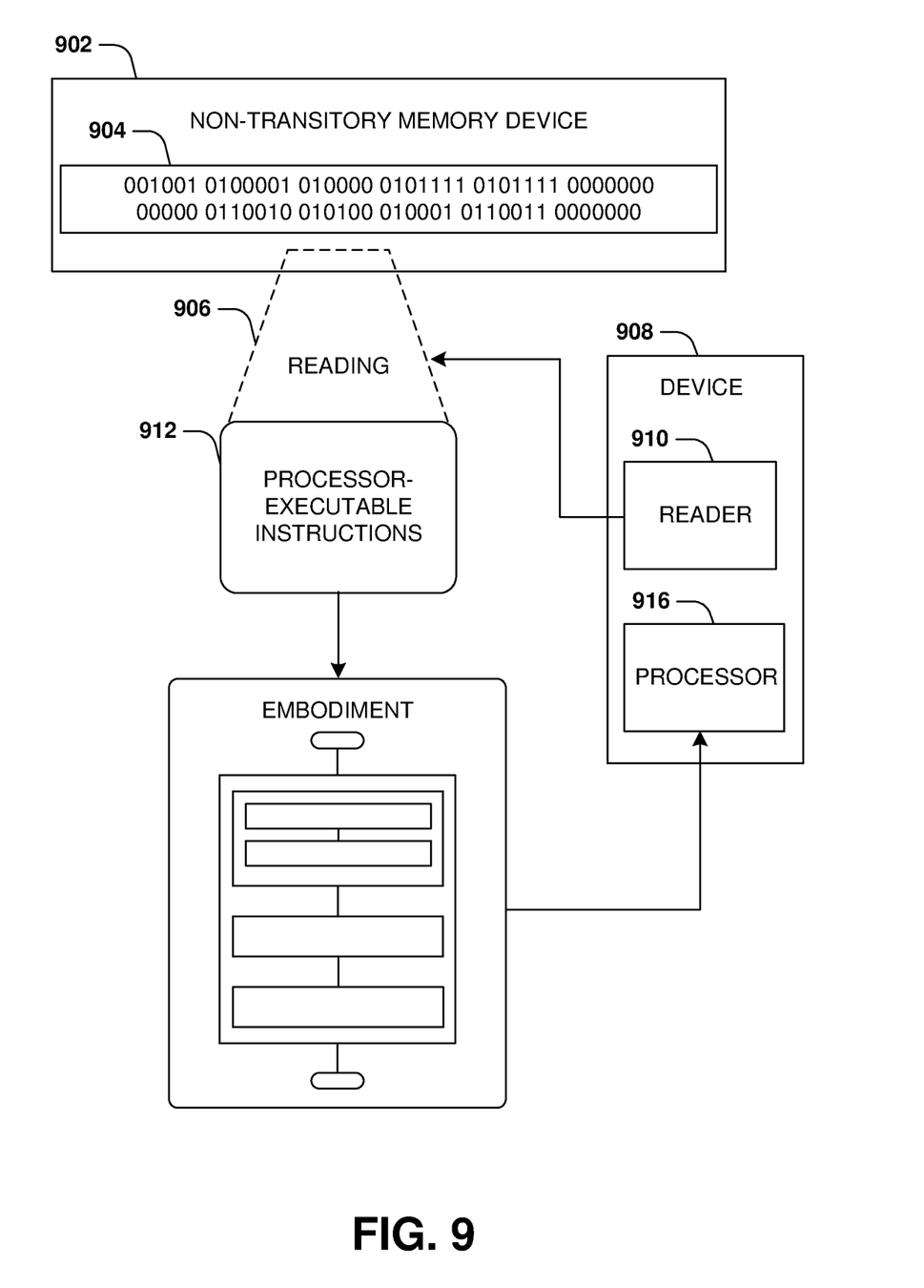
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIG. 5, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of user authentication, comprising:
   executing, on a processor of a computing device, instructions that cause the computing device to perform operations, the operations comprising:
      establishing an authentication relationship between an authentication entity hosted within an authentication computing device and a remote device connected to the authentication computing device via a first network connection;
      receiving a request from the remote device over the first network connection by the authentication entity to authenticate a user registered with the authentication entity;
      responsive to receiving the request to authenticate the user from the remote device over the first network connection, facilitating a biometric authentication challenge provided to the user through a first computing device connected to the authentication computing device via a second network connection and remote to the remote device, wherein the first network connection is different than the second network connection;
      determining a result of the user attempting to authenticate through the biometric authentication challenge provided to the user through the first computing device; and
      transmitting a message over the first network connection from the authentication entity to the remote device based upon the result, wherein the message specifies that the user either successfully authenticated or failed to authenticate through the biometric authentication challenge, wherein the transmitting a message comprises transmitting the message to the remote device to invoke the remote device to unlock a lock based upon the message indicating successful authentication.

2. The method of claim 1, comprising:
   sending a command from the authentication computing device hosting the authentication entity to the first computing device to invoke the first computing device to execute the biometric authentication challenge; and
   receiving the result from the first computing device by the authentication entity at the authentication computing device.

3. The method of claim 1, comprising:
   transmitting a second message to the remote device.

4. The method of claim 3, wherein the transmitting a second message comprises:
   transmitting the second message to the remote device to invoke the remote device to lock a second lock based upon the second message indicating failed authentication.

5. The method of claim 1, comprising:
   maintaining a plurality of authentication relationships between the authentication entity and a plurality of remote devices, wherein the plurality of remote devices comprises the remote device hosting a first service having a first account with the user and a second remote device hosting a second service having a second account with the user.

6. The method of claim 1, comprising:
   receiving the result comprising an encrypted key created based upon authentication of a user fingerprint.

7. The method of claim 1, wherein the receiving a request comprises:
   receiving imagery captured by a sensor associated with an entrance, wherein the imagery depicts an entity attempting to gain access to a location through the entrance; and
   invoking the first computing device to render the imagery with the biometric authentication challenge.

8. The method of claim 1, wherein the receiving a request comprises:
   receiving sensor data, comprising at least one of an image, video, audio, or location information, acquired by a sensor associated with an entrance, wherein the sensor data is indicative of an entity attempting to gain access to a location through the entrance; and
   invoking the first computing device to display the sensor data to indicate that the entity is attempting to gain access into the location.

9. The method of claim 1, wherein the receiving a request comprises:
   evaluating the request to determine that the user is attempting to gain access to a location through an entrance based upon locational data associated with the first computing device of the user.

10. A computing device comprising:
    a processor; and
    memory comprising processor-executable instructions that when executed by the processor cause performance of operations, the operations comprising:
       establishing an authentication relationship between an authentication entity hosted within an authentication computing device and a remote device connected to the authentication computing device via a first network connection;

evaluating user signals of a user of a first computing device connected to the authentication computing device via a second network connection to determine that the user has a threshold likelihood of attempting to access a service provided by the remote device, wherein the first network connection is different than the second network connection;

responsive to determining that the user has the threshold likelihood of attempting to access the service provided by the remote device connected to the authentication computing device via the first network connection, facilitating a biometric authentication challenge provided to the user through the first computing device connected to the authentication computing device via the second network connection and remote to the remote device;

determining whether the user successfully authenticated or failed to authenticate through the biometric authentication challenge; and transmitting a message over the first network connection from the authentication entity to the remote device based upon a result of the biometric authentication challenge, wherein the message specifies that the user either successfully authenticated or failed to authenticate through the biometric authentication challenge, wherein the transmitting a message comprises transmitting the message to the remote device to invoke the remote device to unlock a lock based upon the message indicating successful authentication.

11. The computing device of claim 10, wherein the operations comprise:
evaluating the user signals to determine that a location of the first computing device is within a threshold distance of an entrance that is locked, wherein the remote device is configured to lock and unlock the entrance based upon authentication of the user.

12. The computing device of claim 10, wherein the operations comprise:
evaluating the user signals to identify a current time; and
evaluating historic user activity data to determine that the user accesses the service within a threshold time of the current time.

13. The computing device of claim 10, wherein the operations comprise:
identifying a current location of a device attempting to access the service;
evaluating the user signals to determine that the user is not located at the current location; and
providing an alert to the user through the first computing device of the attempted access.

14. The computing device of claim 10, wherein the operations comprise:
identifying a current time associated with a device attempting to access the service;
evaluating the user signals to determine that the user does not historically access the service within a threshold time of the current time; and
providing an alert to the user through the first computing device of the attempted access.

15. The computing device of claim 10, wherein the operations comprise:

maintaining a frequency of access parameter specifying a frequency at which the user accesses the service;
evaluating the user signals to determine that a device attempting to access the service deviates from the frequency of access parameter; and
providing an alert to the user through the first computing device of the attempted access.

16. A non-transitory machine readable medium having stored thereon processor-executable instructions that when executed cause performance of operations, the operations comprising:

establishing an authentication relationship between an authentication computing device and a remote device hosting a service with which a user of a first computing device has an account, wherein the authentication computing device, the first computing device, and the remote device are remotely connected over a network;

receiving a request by the authentication computing device over the network from the remote device to authenticate the user, wherein the receiving a request comprises:

receiving sensor data, comprising at least one of an image, video, audio, or location information, acquired by a sensor associated with an entrance, wherein the sensor data is indicative of an entity attempting to gain access to a location through the entrance; and invoking the first computing device to display the sensor data to indicate that the entity is attempting to gain access into the location;

transmitting a command from the authentication computing device to the first computing device to provide a biometric authentication challenge to the user through the first computing device;

receiving a result by the authentication computing device over the network from the first computing device of the user attempting to authenticate through the biometric authentication challenge;

in response to the result indicating successful authentication, transmitting from the authentication computing device over the network to the remote device a success message; and in response to the result indicating failed authentication, transmitting from the authentication computing device over the network to the remote device a failure message.

17. The non-transitory machine readable medium of claim 16, wherein the operations comprise:
receiving a revoke request from the first computing device to revoke the authentication relationship, wherein the revoke request indicates that the user successfully authenticated with the first computing device; and
revoking the authentication relationship.

18. The non-transitory machine readable medium of claim 17, wherein the revoke request indicates that the user successful authenticated through a fingerprint authentication and a second authentication mechanism for the account of the user with the remote device.

19. The non-transitory machine readable medium of claim 16, wherein the authentication relationship specifies that the user and a second user are allowed to have access to the account upon successful biometric authentication.

20. The non-transitory machine readable medium of claim 16, wherein the service is a temporally limited service where the authentication relationship expires after a time period.

* * * * *